April 24, 1956 K. SCHOLL 2,743,346
INERT GAS WELDING TORCH WITH ADJUSTABLE TIP
Filed March 16, 1953
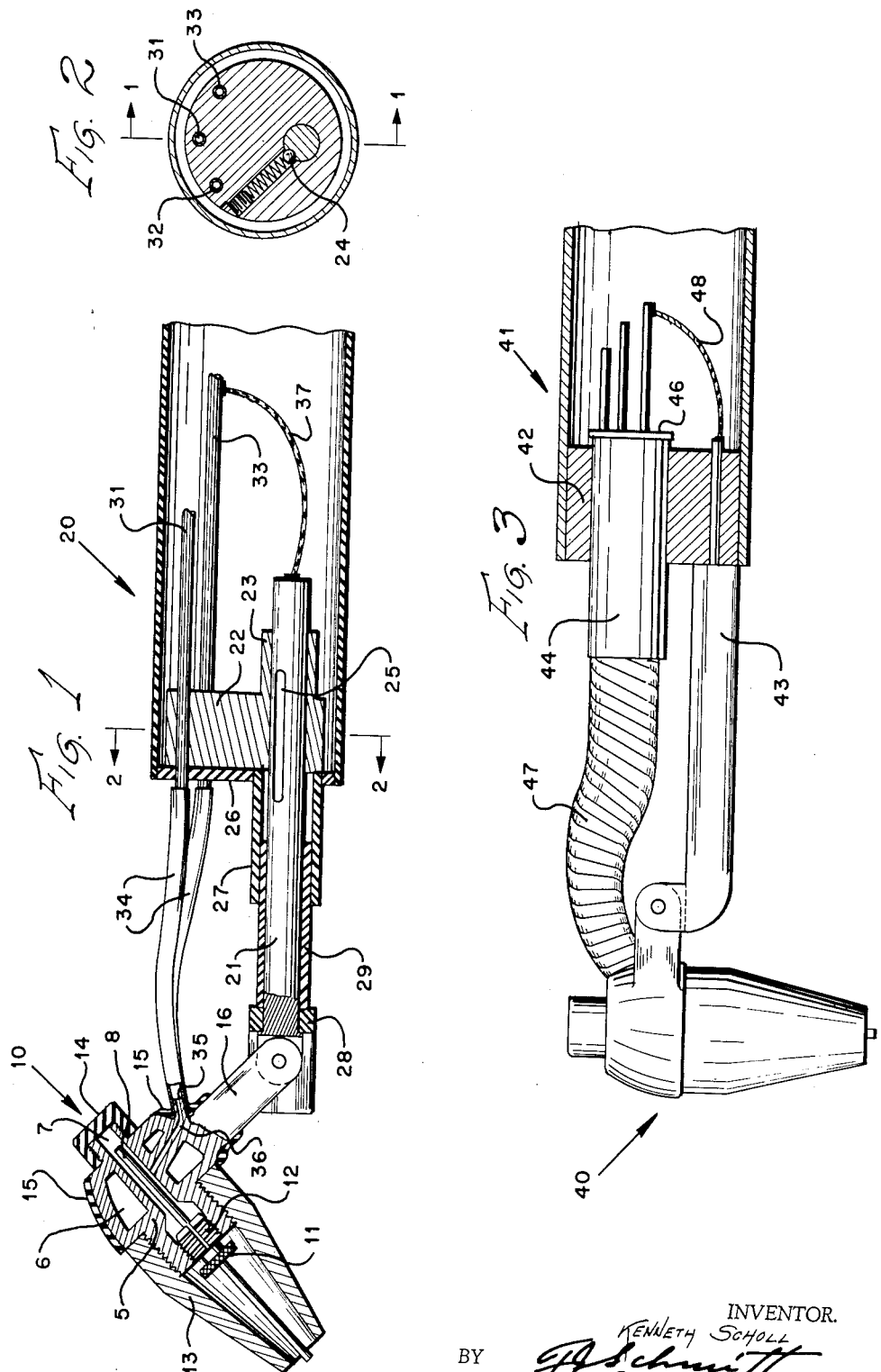

United States Patent Office 2,743,346
Patented Apr. 24, 1956

2,743,346

INERT GAS WELDING TORCH WITH ADJUSTABLE TIP

Kenneth Scholl, Souderton, Pa.

Application March 16, 1953, Serial No. 342,769

8 Claims. (Cl. 219—14)

(Granted under Title 35, U. S. Code (1952), sec. 266)

The invention described herein may be manufactured and used by, or for, the Government of the United States of America for governmental purposes without the payment of any royalties thereon or therefor.

The present invention relates to an inert gas welding torch with an adjustable tip and more particularly to a welding torch having an adjustable tip pivotally mounted on the end of a rod which is slidably mounted in the handle assembly of a torch.

The torch generally used in the past for inert gas welding was one in which the tip or head was secured fixedly to the handle of an angle of approximately 135° to the longitudinal axis of the handle. This fixed angle between the tip and the handle has always severely limited the operator as to the types of jobs that can be welded and it has also prevented the operator from getting into small, hard-to-weld areas.

In at least one instance an effort has been made to overcome the disadvantages inherent in the fixed tip or head. The tip of an inert gas welding torch was pivotally mounted on the end of the handle and the various fluid passages within the handle were connected to the corresponding passages within the tip by means of short sections of flexible tubing in order to provide a continuous flow of the necessary fluids to and from the tip, regardless of its angular position. This modified form of torch did facilitate certain welding operations, but it was also characterized by a serious inherent disadvantage. In some positions of the tip the flow of fluid through the various sections of flexible tubing was apt to be restricted or cut off by distortion of the sections of tubing as they were bent to sharply curved positions about relatively small radii.

The instant invention contemplates a novel arrangement for mounting a tip on an inert gas welding torch for adjustment through a relatively wide angular range. This arrangement comprises a rod pivotally connected at one end to the tip and slidably mounted at the other end in the body or handle of the torch for limited longitudinal movement therein. In this device the multiple fluid passages within the handle are connected to the corresponding passages within the tip by a corresponding plurality of sections of flexible tubing extending along a relatively flat arcuate path between the forward end of the handle assembly and the upper end of the tip assembly. With this mounting arrangement pivotal movement of the tip about the outer end of the rod is accompanied by corresponding sliding movement of the rod so that bending of the sections of flexible tubing extending between the tip and the handle is at all times minimized. By means of this arrangement serious deformation or pinching off of the tubing which frequently accompanies bending tubing around a small radius is prevented, thus precluding the possibility that flow of fluids in the tubing will be seriously restricted or cut off. At the same time, the arrangement described above precludes lateral displacement of the tubing relative to the elongated handle, so that the cross-sectional bulk of the torch assembly is not increased by changes in the position of the tip. Consequently, a torch assembly incorporating the instant invention is so compact that it is especially well suited for work in closely confined space from which more bulky configurations are excluded because of their bulk or because of components projecting therefrom.

An object of the present invention is the provision of an angularly adjustable tip for a welding torch suitable for inert gas welding.

Another object is to provide a special mounting means for an adjustable welding tip arranged to prevent kinking or serious distortion of the flexible tubing interconnecting the adjustable tip and the handle assembly of a torch.

Still another object of this invention is to provide a flexible shield for all of the sections of flexible tubing extending between the handle of a welding torch and the adjustable tip thereof.

The exact nature of this invention as well as other objects and advantages thereof will be readily apparent from consideration of the following specification relating to the annexed drawing in which:

Fig. 1 shows a side elevation, partly in section, of one embodiment of the invention, Fig. 2 represents a section of the device taken on line 2—2 of Fig. 1, and Fig. 3 shows a longitudinal side elevation, partly in section, of a second embodiment of the invention.

In this drawing like reference numerals designate like or corresponding parts throughout the several views.

Referring first to Fig. 1, the tip assembly designated by the numeral 10 includes a tip or head 5 which is provided with suitable internal passages 6 for the circulation of cooling water. The tip 5 is also provided with the usual opening 7 extending from the top to the bottom of the tip to accommodate the usual tungsten or other inert electrode 8, and to permit the flow of the inert gas down around the electrode. The electrode 8 is maintained in position by the threaded plug 11 which is provided with the usual slits 12 to allow the inert gas to flow into the ceramic cup 13 shown in section. The upper end of the tip is sealed by a cap 14 or a closed tube when a longer tungsten electrode is used. The tip may be completely covered with insulating material 15 which may be molded around the entire tip. The tip or head is also provided with an arm 16 projecting from one side thereof, which is pivotally secured to the bifurcated outer end of the slide rod 21.

Referring again to Fig. 1, the slide rod 21 is mounted in the body member 22 located in the forward end of the handle assembly generally designated by the numeral 20. In order to provide adequate support for the rod 21, the body member 22 is fitted with a rearwardly extending bushing 23. The sliding movement of the rod 21 within the body 22 is limited by the spring pressed ball 24 which rides in the longitudinal groove 25 in the surface of the rod 21. One suitable arrangement of the ball assembly is shown in section in Fig. 2. The ball 25 also prevents rotation of the rod 21 and the tip assembly 10 relative to the longitudinal axis of the handle assembly 20. In order to electrically insulate the front face of the body member 22 and the surface of the slide rod 21 to prevent accidental shorting with the work, a two part cover of insulating material is provided. The first part of the cover comprises a plate or disc 26, secured to the face of body 22 and having an outwardly projecting tubular member 27 attached thereto which is located concentrically around and spaced from slide rod 21. The second part of the cover includes a slotted sleeve 28 mounted upon the outer end of the rod 21 and extended around the pivotal connection with arm 16 of the tip assembly 10 to prevent contact of the arm 16 with the work. The second part of the cover also includes a tube 29 secured to the slide rod as shown in Fig. 1. The outside diameter of tube 29 is so selected that the tube will slide freely within the tubular member 27.

Within the handle assembly 20 a gas inlet tube 31 and cooling water tubes 32 and 33 are mounted in suitably spaced openings in the body member 22 as shown best in Fig. 2. Each of these tubes is arranged to project a short distance beyond the front face of the body member 22 to provide mounting means for the attachment of flexible tubing. A section of flexible tubing 34 is used to connect each of the tubes 31, 32 and 33 to the corresponding passage within the tip 5. For example, the gas inlet tube 31 is connected by flexible tubing to the gas inlet fitting 35, mounted on the outside surface of the tip 5 and in communication through passage 36 with the opening 7 within the tip 5. Likewise, the cooling water inlet tube 32 is connected by means of flexible tubing to the passages 6 within the tip 5 and thence to the cooling water outlet tube 33, again by means of flexible tubing. In order to protect the several sections of flexible tubing extending between the tip and the body they may all be inserted within in a single flexible sleeve made from some suitable material such as silicone rubber which is capable of withstanding heat and at the same time remains very flexible. This flexible sleeve has been omitted from Fig. 1 in order to simplify the showing therein. However, it could be mounted substantially in the manner shown for the corresponding element 47 in Fig. 3.

This high frequency starting current and the welding current are conducted to the tip or head in the usual manner through a conventional cable connection to the water outlet tube 33. A jumper cable 37 is arranged to interconnect the outlet tube 33 and the slide rod 21 to provide a positive electrical connection and prevent possible arcing between the rod 21 and the bushing 23. The outside shell of the handle assembly 20 may be made of any suitable non-conducting material such as plastic or fiber tubing.

Another embodiment of the instant invention is shown in Fig. 3. The tip assembly 40 is substantially the same as the corresponding assembly 10 shown in Fig. 1. In this embodiment, as in the one described with reference to Fig. 1, the tip assembly 40 is connected by means of sections of flexible tubing to the gas inlet tube and the cooling water tubes within the handle assembly 41. However, the manner in which the tubes are mounted within the body 42 and the manner in which the rod 43 is secured to the body 42 are different. The rod 43 is fixedly secured to the front face of the body 42 so that the tip assembly 40 which is pivotally connected to the outer end of rod 43, is adjustable about an axis in fixed spacial relation to the handle assembly 41.

In order to provide the relative sliding relationship between the rod and the tubing which is characteristic of this invention, this embodiment of the device is provided with a bushing 44 slidably mounted in a large aperture in the body member 42. The gas inlet tube and the cooling water tubes extend through and are secured to a closure plate 46 mounted upon the inner end of the bushing 44. As in the embodiment formerly described each of these tubes is connected to a corresponding fitting on the tip assembly 40 by means of a section of flexible tubing. In this form of the instant invention, the tubes within the handle must also be flexible to permit sliding movement of the bushing 44. Therefore, in this modification the tubes within the handle may be integral with the sections of tubing extending to the tip.

All of the sections of flexible tubing extending from the handle assembly to the tip assembly are protected by a flexible metal tube 47 secured at one end to the tip assembly 40 and at the other end to the outer end of the bushing 44.

A jumper cable 48 may conveniently be arranged to interconnect the cooling water outlet tube and the rod 43 so as to provide a positive electrical connection to the tip. In an alternate arrangement this cable may be connected instead to the flexible metal tube 47, if desired.

In operation, the device described herein is used in the same way that the conventional inert gas welding torch is used. In the form of this invention shown in Fig. 1, the tip assembly is manually pivoted into the desired angular position while the slide rod moves simultaneously in response to the movement of the tip assembly. When the tip assembly is positioned at a 90° angle from the handle assembly, the slide rod is fully retracted within the handle assembly and the slotted sleeve 28 is in abutment with the outer end of the tubular member 27. As the tip assembly is moved pivotally to increase the angle between it and the handle assembly, the slide rod is withdrawn from the handle assembly to maintain a relatively fixed distance between the ends of the tubes 31, 32 and 33 and the corresponding fittings on the tip assembly. This automatic translational movement of the pivot accompanying adjustment of the tip assembly prevents kinking of the flexible tubing interconnecting the handle assembly and the tip assembly.

In the form of the instant invention shown in Fig. 3, as the tip assembly is moved in a clockwise direction about its pivot, the tube 47 pushes the bushing 44 into the handle assembly. This sliding movement of the bushing 44 prevents excessive bending of the sections of flexible tubing contained in tube 47 as the tip assembly is moved pivotally about the end of the rod upon which it is mounted. Since the portions of the gas inlet tube and the cooling water inlet and outlet tubes within the handle assembly are also made from flexible tubing in this modification of the instant invention, each of these tubes is fixedly secured to the plate 46 mounted upon the sliding bushing 44, so that they move longitudinally of the handle assembly in response to movements of the bushing 44.

The instant invention is thus characterized by a tip assembly for an inert gas welding torch which is continuously adjustable from a 90° angle to a 180° angle with respect to the longitudinal axis of the handle assembly. This wide range of adjustment allows the operator to maintain the proper angle of the tip assembly relative to the work at all times, a factor essential to successful inert gas welding. Moreover, the adjustable tip assembly described above permits the operator to properly weld assemblies that could not be welded with conventional inert gas welding torches.

The instant invention is also adaptable to design features which substantially increase its utility and durability. The welding torch described herein is so designed that the molded plastic material used to form insulating layers on the exterior surfaces of the torch assembly may conveniently be formed in various separate parts including suitable sleeves and tubes, each of which may be independently replaced if necessary rather than replacing the entire torch. In addition, the torch described herein may readily be made from aluminum which results in a greatly reduced total weight in comparison to the conventional commercial torches customarily made of brass.

Various modifications are contemplated and may obviously be resorted to by those skilled in the art without departing from the spirit and scope of this invention.

What is claimed is:

1. A compact inert gas welding torch including an elongated handle, an elongated tip supporting rod arranged to project from one end of said body member, a welding tip pivotally mounted upon the outer end of said rod, and a plurality of flexible conduit means connected to said tip and arranged to pass through said body member from a point adjacent said rod, said rod and said conduit means being slidable relative to each other within the body member, whereby the flexible conduit means are continuously compactly disposed in substantially coplanar alignment with said body member and said rod without being bent excessively when the tip is moved pivotally about the outer end of the rod.

2. An inert gas welding torch comprising an elongated handle, an elongated tip supporting rod projecting from one end of said handle and mounted for slidable movement longitudinally thereof, a welding tip pivotally mounted upon one end of said rod, said tip including means for supporting an inert gas welding electrode and a cup disposed around the electrode, means for conducting electrical current from a power source to an electrode mounted in the tip via said rod, and a plurality of flexible fluid conduit means interconnecting substantially coplanar points on the handle and the tip to convey an inert gas to the tip and thence out through a cup mounted thereon, and to circulate a cooling liquid through the tip, whereby slidable displacement of the rod relative to the handle as the tip is pivotally adjusted maintains said flexible fluid conduit means in substantially coplanar alignment with said body member and said rod without excessive bending of said flexible fluid conduit means.

3. An inert gas welding torch comprising a body member, an elongated hollow handle attached at one end to the body member and extending rearwardly therefrom, a plurality of hollow tubes extending through suitable apertures in said body member and thence through said handle to provide for the flow of an inert gas and the circulation of a cooling fluid, an elongated rod non-rotatably mounted in said body member adjacent to said hollow tubes and projecting forwardly therefrom for sliding movement longitudinally of said handle, a welding tip pivotally mounted on the forward end of said elongated rod for rotation about an axis substantially perpendicular to the longitudinal axis of said rod, means mounted in said tip for supporting an inert gas welding electrode, said tip being provided with a passage therethrough for the discharge of an inert gas and with a cavity therein for the circulation of a cooling fluid, and a plurality of flexible fluid conduits interconnecting said hollow tubes through the body member and the passage and cavity within the tip for supplying inert gas to the passage through the tip and for circulating the cooling liquid through the cavity in the tip, whereby slidable displacement of the rod relative to the handle as the tip is pivotally adjusted maintains said flexible fluid conduit means in substantially coplanar alignment with the longitudinal axes of said handle and said rod without excessive bending of said flexible fluid conduit means.

4. An inert gas welding torch comprising an elongated handle assembly, a tip supporting rod projecting from and fixedly secured to one end of said handle assembly, a welding tip pivotally mounted upon the end of said rod, said tip including means for supporting an inert gas welding electrode and a cup disposed around the electrode, means for conducting electrical current from a power source to an electrode mounted in the tip via said rod, a bushing slidably mounted in said handle assembly adjacent to and substantially parallel to said rod, and a plurality of flexible fluid conduit means extending through and secured to said bushing and including portions connected to suitable openings in said tip adjacent to its pivotal mounting to convey an inert gas to said tip and thence out through the cup mounted thereon and to circulate a cooling liquid through the tip, whereby pivotal adjustment of said tip is accompanied by slidable displacement of said bushing within the handle assembly to correspondingly adjust the length of flexible fluid conduit extending between the tip and the handle assembly in order to maintain the extended portions of the flexible fluid conduits in substantially coplanar alignment with the handle and the rod without excessive bending of the respective flexible fluid conduits.

5. An inert gas welding torch comprising a body member, the body member having an aperture therethrough, a plurality of flexible fluid conduits including an inert gas supply tube and cooling fluid inlet and outlet tubes extending through and secured to said bushing, an elongated hollow handle mounted upon and extending rearwardly from the body member, a tip supporting rod fixedly secured to and extending forwardly from the body member adjacent to the aperture therethrough, a welding tip pivotally mounted upon the forward end of the rod for rotation about an axis perpendicular to the longitudinal axis of said rod, means within said tip for supporting an inert gas welding electrode, said tip being provided with a passage therethrough for the flow of inert gas and a cavity therein for the circulation of a cooling fluid, the flexible fluid conduit comprising the inert gas supply tube being secured at one end to the tip adjacent to its pivotal mounting and in communication with the passage therethrough and the pair of flexible fluid conduits comprising the cooling liquid inlet and outlet tubes being secured at one end to the tip adjacent to its pivotal mounting and in communication with the cavity therein, whereby pivotal adjustment of said tip is accompanied by slidable displacement of said bushing within the body member to correspondingly adjust the length of the flexible fluid conduits extending between the tip and the handle in order to maintain the extended portions of the flexible fluid conduits in substantially coplanar alignment with the longitudinal axes of the handle and the rod without excessive bending of the respective flexible fluid conduits.

6. A device as described in claim 4, and, in addition, a flexible protective sleeve enclosing all of the flexible conduits and secured at one end to the tip and at the other end to the bushing.

7. An inert gas welding torch comprising a body member having an aperture therethrough, an elongated hollow handle attached to and extending rearwardly from the body member, a tip supporting rod fixedly secured to and extending forwardly from the body member adjacent the aperture therethrough, a welding tip pivotally mounted upon the forward end of the rod for rotation about an axis perpendicular to the longitudinal axis of said rod, means within said tip for supporting an inert gas welding electrode, said tip being provided with a passage therethrough for the emission of an inert gas and with a cavity therein for the circulation of a cooling fluid, an elongated bushing slidably mounted in the aperture through said body member for movement parallel to said rod, a plurality of flexible fluid conduits including an inert gas supply tube secured at one end to the tip in communication with the passage therethrough and cooling fluid inlet and outlet tubes each secured at one end to the tip in communication with the cavity therein all extending through said bushing, and a protective sleeve enclosing all of the flexible conduits, secured at one end to the tip and at the other end to the bushing, whereby pivotal adjustment of said tip is automatically accompanied by slidable displacement of said bushing within the body member to correspondingly adjust the length of the flexible fluid conduits extending between the tip and the handle in order to maintain the extended portions of the flexible fluid conduits in substantially coplanar alignment with the handle and the rod without excessive bending of the respective flexible fluid conduits.

8. A device as described in claim 3, wherein the outer surfaces of said handle and said tip are covered by a protective layer of electrically insulating material and the portion of said elongated rod projecting from said body member is enclosed by a pair of telescopically interfitted electrically insulating sleeves, one of which is fixedly secured to said handle and the other of which is fixedly secured to said elongated rod, whereby the entire torch is shielded without interfering with displacement of the rod as the tip is adjusted.

References Cited in the file of this patent

UNITED STATES PATENTS

| | | |
|---|---|---|
| 2,344,775 | Holslag | Mar. 21, 1944 |
| 2,468,805 | Herbst | May 3, 1949 |
| 2,547,872 | Kissick | Apr. 3, 1951 |
| 2,594,333 | Medicus | Apr. 29, 1952 |